3,253,927
PLASTIC SHORTENING
Louis H. Going, Loveland, and Robert D. Dobson, Greenhills, Ohio, assignors to The Procter & Gamble Company, Cincinnati, Ohio, a corporation of Ohio
No Drawing. Filed May 15, 1963, Ser. No. 280,732
10 Claims. (Cl. 99—118)

This invention relates to an improved plastic shortening and more particularly to a plastic shortening having a stable beta-phase crystalline form.

Conventional non-fluid plastic shortenings are composed essentially of solid fats or of mixtures of solid fats and liquid oils which have been processed by various techniques which make the product plastic and workable at room temperature. It is well known in the art that certain kinds of fat crystals, notably the beta-prime crystals, have the capacity to form a rigidly interlocking structure when suspended in a liquid component if the solids are present in sufficient amounts.

Most plastic fat mixtures used in shortening contain about 15% to 25% of triglycerides which are solid at room temperature, although sufficient interlocking structure to interfere with the free-flowing properties of a mixture can occur at solid fat levels as low as 5%. The solid appearance of conventional plastic shortenings is based upon this particular structure building capacity of saturated triglycerides existing largely in the beta-prime crystalline form.

Conventional plastic shortenings containing solid triglycerides in the beta-prime crystalline form, hereinafter referred to as "beta-prime plastic shortenings," are noticeably deficient in their ability to withstand storage at temperatures of the order of 90° F. for a month or so without appreciable change in their plastic characteristics. Some types of beta-prime plastic shortenings tend to stiffen or firm excessively and thus become difficult to blend with other constituents in normal food recipes. Other types of beta-prime plastic shortenings tend to become less firm and even soften to a pourable consistency and thereby lose certain desirable characteristics for their intended use.

Although the beta-phase crystalline form of triglyceride is known to be a more thermodynamically stable crystalline phase than the beta-prime phase, it has not been general practice to employ shortenings with the solid phase in the beta crystalline form in place of beta-prime shortenings since the former tend to have a soupy consistency and translucent appearance.

Holman and Quimby, U.S. Patent 2,521,219, and Mitchell, U.S. Patent 2,521,242, show that the beta-phase crystals of saturated triglycerides lack the structure-building characteristics of the corresponding beta-prime crystals, so that slurries containing up to 60% of beta-phase crystals tend to remain fluid and pourable throughout a range of temperatures of from 70° F. to 100° F.

The characteristic tendency of beta-phase crystals to impart fluidity to solid-liquid fat mixtures has caused manufacturers of plastic shortenings to deliberately avoid the use of materials which tend to develop a beta-crystalline phase under normal storage conditions at temperatures in the range of 70° to 100° F. Contrariwise, this tendency toward fluidity has facilitated the production of liquid shortenings such as described by Holman and Sanders, U.S. Patent 2,815,285; Andre and Going, U.S. Patent 2,815,286; Brock, U.S. Patent 2,868,652; and Payne and Seybert, U.S. Patent 2,999,022.

Other technologists in the shortening field have attempted to prepare beta-phase plastic shortenings having plasticity characteristics that are not appreciably changed during storage periods of a month or so at temperatures of the order of 90° F. For example, one such plastic shortening which is not subject to the storage instability of conventional beta-prime shortenings is described by Lutton in U.S. Patent 2,801,177. However, the shortening described by Lutton is limited not only to a narrow selection of fatty acids which can be present in either the liquid base stock or the solid hardstock but also to a narrow range of hydrogenation of the base stock which can be used to form a suitable storage-stable plastic shortening. Moreover, the practical usefulness of the Lutton shortening is limited since the hardstocks which can be used in any substantial proportion do not include the commercially desirable cottonseed and soybean hardstocks.

In general, a beta-phase plastic shortening will require more solid triglyceride in the liquid component for a given plasticity or rigidity than a beta-prime plastic shortening. This can result in an undesirably high proportion of saturated triglycerides and undesirably high cloud and congeal points.

A primary object of this invention is to provide an improved plastic shortening having excellent storage stability in consistency and appearance over a temperature range of about 70° F. to 100° F. without having undesirably high cloud and congeal points.

The plastic shortening of this invention comprises, by weight of the shortening, from about 50% to about 95% glyceride base stock having an iodine value greater than about 50 and from about 5% to about 50% substantially completely hydrogenated triglyceride hardstock having an iodine value not exceeding about 72, said substantially completely hydrogenated triglyceride consisting essentially of beta-phase-tending hardstock and non-beta-phase-tending hardstock in a weight ratio of from about 9:1 to about 1:1, at least about 70% of the shortening solids being in a beta-phase.

As used herein, the term "beta-phase-tending" defines as overall general tendency of certain triglyceride solids to crystallize in a beta-phase; and the term "non-beta-phase-tending" defines an overall general tendency of certain other triglyceride solids to crystallize in a phase other than beta-phase. This does not mean, however, that under proper conditions triglyceride solids cannot be transformed from a non-beta-phase into a beta-phase.

As used herein, the term "plastic" shortening defines a solid, non-fluid, non-pourable and non-pumpable shortening at room temperature (70° F.–100° F.). Said shortening must have a yield point high enough to prevent product flow at room temperature; that is, it must not only be sufficiently solid to prevent product deformation under its own weight in ordinary commercial unit quantities, but also must be non-pumpable with ordinary commercial pumps which are conventionally used for pumping liquids or fluids at room temperature.

The base stock of the shortening of this invention can be any edible normally liquid glyceride oil or a partially hydrogenated glyceride oil or fat having an iodine value greater than about 50. Suitable base stock glycerides can be derived from animal, vegetable or marine sources, including naturally-occurring triglyceride oils and fats such as cottonseed oil, soybean oil, peanut oil, coconut oil, palm kernel oil, olive oil, palm oil, corn oil, rapeseed oil, sunflower seed oil, sesame oil, safflower oil, sardine oil, lard, tallow and the like. Very highly unsaturated oils may require some hydrogenation to improve their resistance to oxidative deterioration. Hydrogenation to reduce the iodine value of these highly unsaturated oils to less than about 130 generally is sufficient for purposes of this invention. A preferred base stock is partially hydrogenated soybean oil having an iodine value of from about 75 to about 110.

Other suitable base stock glycerides having iodine values greater than about 50 for use in this invention can be derived from natural or synthetic fats and oils containing in the glyceride molecule long chain acyl radicals having from about 12 to about 24 carbon atoms such as lauroyl, laureoyl, myristoyl, myristoleoyl, palmitoyl, palmitoleoyl, stearoyl, oleoyl, linoleoyl, linolenoyl, elaidoyl, arachidoyl, gadoleoyl, arachidonoyl, behenoyl, erucoyl, brassidoyl, clupadonoyl, lignoceroyl, and/or selacholeoyl. A portion of the base stock glyceride also can contain in the molecule one or two short chain acyl groups having from 2 to about 10 carbon atoms such as acetyl, propanoyl, butanoyl, pentanoyl, hexanoyl and the like. Suitable base stock also can be derived from randomly and low temperature interesterified fatty triglyceride containing oils and fats such as interesterified cottonseed oil and lard.

Suitable partial hydrogenation of the liquid soybean oil to form the preferred base stock of this invention can be carried out by conventional methods and usually consists of a batch process whereby the oil is contacted with hydrogen in the presence of nickel catalyst.

The iodine value (I.V.) of an oil or fat indicates the number of grams of iodine equivalent to the halogen absorbed by a 100 gram sample. In general, the lower the iodine value of a given fat or oil, the greater will be its content of solids at a given temperature. That is, as the triglyceride molecules become more saturated by the addition of hydrogen (or the double bond content decreases), the consistency of the fat or oil becomes more solid. The iodine value can be readily determined by the well-known Wijs method.

A reasonably accurate approximation of the percent by weight of solids in a sample of fat or oil at any given temperature can be determined dilatometrically by a method described in 31 J. Am. Oil Chemists Society 98–103 (March 1954). The approximation of the solids content of the sample according to this method is stated in terms of a solids content index (S.C.I.). For example, the above-described range of iodine values of from about 50 to about 130 for the partially hydrogenated glyceride base stock corresponds approximately to a range of solids content index of from about 0 to about 75 at 70° F.

The substantially completely hydrogenated triglyceride hardstock of the shortening of this invention should have an iodine value not exceeding about 12. The hardstock must be formed to consist essentially of beta-phase-tending hardstock and non-beta-phase-tending hardstock in a weight ratio of from about 9:1 to about 1:1.

Examples of beta-phase-tending triglyceride hardstocks which can be used in the practice of this invention are tristearin, tripalmitin, and symmetrical palmitodistearin. Other suitable triglyceride hardstocks having strong beta-forming tendencies can be derived from substantially completely hydrogenated fats and oils such as lard, sunflower seed oil, safflower seed oil, linseed oil, sesame seed oil, hazelnut oil, soybean oil, peanut oil, olive oil, and corn oil. A preferred beta-phase-tending triglyceride hardstock component is substantially completely hydrogenated soybean oil having an iodine value of about 8.

The preferred non-beta-phase-tending hardstock component of the shortening of this invention is substantially completely hydrogenated rapeseed oil having an iodine value not exceeding about 12. This material tends to crystallize in the beta-prime-phase and is known to hinder the formation of beta-phase crystals in a conventional plastic shortening. Unexpectedly, however, it has been found that substantially completely hydrogenated rapeseed oil gives superior stiffening power to a beta-phase plastic shortening without preventing transformation of substantially all the shortening solids, including the non-beta-phase-tending solids, to beta-phase when used in combination with a beta-phase-tending hardstock in the aforesaid proportions. The use of the above-described blend of beta-phase-tending and non-beta-phase-tending hardstocks enables the preparation of beta-phase shortenings having the desirable plastic consistency and appearance of a freshly prepared conventional beta-prime plastic shortening without the storage instability of the conventional beta-prime shortening. Other non-beta-phase-tending hardstocks which can be used in the practice of this invention are substantially completely hydrogenated cottonseed oil, and substantially completely hydrogenated fats and oils having a high proportion of fatty acids containing 20 to 24 carbon atoms such as mustard seed oil, salmon oil, herring oil, pilchard oil, menhaden oil and sardine oil.

The glyceride base stock and substantially completely hydrogenated triglyceride hardstock can be combined to form the plastic shortening of this invention by various means whereby all the shortening solids, including the non-beta-phase-tending solids, are substantially in a beta-phase crystalline form of very small particle size. One method of forming a beta-phase plastic shortening is described by Lutton in U.S. Patent 2,801,177, and comprises chilling the melted stock to a temperature of 60° F. to 70° F., passing the chilled stock through a picker box where the heat of crystallization raises the temperature of the shortening stock to about 75° F. to 85° F., and tempering the shortening stock at a temperature of about 90° F. for about 2 days. This method can be used in the practice of this invention provided that the aforesaid proportions of base stock to hardstock and beta-phase-tending hardstock to non-beta-phase-tending hardstock are met. When high percentages of hardstock, such as 25% to 50%, are used in the preparation of shortenings of this invention, it is also necessary to use a higher tempering temperature than disclosed by Lutton, i.e., the tempering temperature should be about 100°–130° F.

A preferred method of forming the beta-phase plastic shortening of this invention comprises forming a completely melted mixture of the base stock and hardstock in the above-described proportions. This generally can be accomplished by heating to a temperature in excess of about 150° F. The melted oil then is pumped through a scraped wall heat exchanger in which the oil is chilled to about 55° F. to 90° F. A suitable device for this purpose, referred to as a freezer or "Votator," is described by Vogt, U.S. Reissue Patent No. 21,406. The oil is chilled to about 70° F. to 90° F. when a high hardstock content of about 25% to 50% is used and to about 55° F. to 70° F. when a low hardstock content of about 5% to 25% is used. In the case of the high hardstock-containing shortening, the chilled stock can be pumped directly into containers where it substantially completes its crystallization. In the case of the low hardstock-containing shortening, the chilled super-cooled mixture preferably is pumped through an agitated unrefrigerated crystallization vessel, known as a picker box, and associated piping or other heat exchanger equipment where the heat of crystallization raises the temperature of the shortening stock to about 60° F. to 80° F. From this second heat exchanger the shortening stock is pumped into containers where it substantially completes its crystallization. Transformation of substantially all the shortening solids to beta-phase then takes place in a tempering room which is held at a temperature of from about 90° F. to 130° F. Within a period of about 12 to about 36 hours the crystalline structure of the shortening solids is converted to beta-phase crystals; that is, both the beta-phase-tending and non-beta-phase-tending solids will be converted to beta-phase crystals.

The plastic beta-phase shortening prepared in the foregoing manner has excellent storage stability in consistency and appearance. It retains its plastic consistency over extended storage periods without loss of its brilliant opaque white appearance.

The shortening of this invention is particularly useful for the preparation of aerated icings of the type described in the co-pending application of Bedenk, Brunner, and Goodrich, U.S. Serial No. 280,734, filed May 15, 1963, now U.S. Patent No. 3,194,666. The stiffening power of the selected combination of hardstocks in the proportions herein defined gives the shortening of this invention the unique ability to form a storage-stable, ready-to-use, prepared icing that retains a fine dispersion of a large volume of air or other edible gas over long periods of storage time. The icing is stable toward slump, bleeding of oil, and collapse on a cake or other baked product wthout drying out and becoming crusty or losing its substantially uniform spreadable characteristics. For icing purposes it is preferable to use a shortening hardstock content of from about 30% to about 45%.

The beta-phase shortening of this invention also imparts storage stability to other food products such as refrigerated pie crusts, peanut spreads and fat-containing toppings. It also has excellent performance in cake batters and can be employed for all-purpose frying.

For use in food products, it is preferable to incorporate in the shortening one or more of the conventional emulsifiers. For example, the ordinary mono- and diglycerides of higher fatty acids such as mono- and distearin and mono- and diolefin can be used as ingredients of the shortening of this invention for these well-known emulsifying purposes. It is preferable to include in the shortening from about 2% to about 6%, by weight, of mono- and diglycerides of hydrogenated soybean oil or mixtures of hydrogenated soybean and cottonseed oils.

Various other additives can be used in the shortening of this invention provided that they are edible and aesthetically desirable and do not have a detrimental effect upon the melting and crystallization characteristics of the shortening. For example, certain common shortening additives such as the higher fatty acid esters of sucrose, sorbitol, sorbitan, polyoxyethylene, and polyoxyethylene sorbitan; lactic and/or citric acid esters of mono- and/or diglycerides, or of other higher fatty acid-containing polyol partial esters; propylene glycol mono-stearate and the like esters; and antioxidants such as butylated hydroxyanisole, butylated hydroxytoluene, citric acid, and methyl silicone are compatible with the beta-phase shortening of this invention and can be incorporated therein if desired.

The following examples illustrate the shortening of this invention, but the invention is not limited to these specific examples.

*Example 1*

A plastic beta-phase shortening was prepared with the following components:

Component: Percent by weight
  Base stock (refined, bleached soybean oil partially hydrogenated to an iodine value of about 107 and a solids content index of 0.32 at 70° F.) -- 86
  Hardstock (substantially completely hydrogenated soybean oil and substantially completely hydrogenated rapeseed oil in a weight ratio of 5.33:1 and having an iodine value of 8) _____ 10
  Mono- and diglycerides of partially hydrogenated soybean and cottonseed oils (in a weight ratio of 85:15) having an iodine value of about 80 _____ 4

The above shortening components were combined and heated to 140° F. with agitation to form a melted oil mixture. 11.6% by volume nitrogen gas was injected into the melted oil mixture. The melted oil mixture was pumped through a scraped wall heat exchanger ("Votator") in which the oil was rapidly chilled with agitation to 55° F. in less than about two minutes. The chilled supercooled mixture which issued from the refrigerated heat exchanger was first passed through an agitated unrefrigerated crystallization vessel known as a picker box and then through a second heat exchanger to raise the temperature of the shortening to about 80° F. and give the shortening a suitable plastic consistency for packing. The shortening stock was pumped into containers (1 pound metal cans) and allowed to crystallize substantially completely. The containers with the substantially completely crystallized shortening were placed in a constant temperature room having a temperature of about 90° F. The shortening was allowed to remain at this temperature for a period of about 3 days, during which time the solid phase of the shortening was converted to predominantly (greater than 90%) beta-phase crystals as determined by X-ray diffraction patterns. The shortening had a solids content index of 13.07 at 70° F.

The cloud point of the shortening was 35.4° C. The standardized procedure used for determining the cloud point is described by Hawley and Dobson, U.S. Patent 2,733,251, and consisted of the following steps: A portion of the material to be examined was heated to about 60° C. and placed in a tall form electrolytic-type beaker (Corning No. 1140). Means for agitating the sample and for reading its temperature were provided. A flowing stream of cold water at a temperature of less than 7° C. was passed around the outside of the beaker at such a rate that the temperature of the shortening in the beaker dropped from 60° C. to 40° C. in about one minute. A beam of white light was passed through the beaker and the sample, the transmitted beam intensity being such that a photocell registered 2 micro-amperes while the sample was wholly liquid. The temperature at which the transmitting beam intensity was reduced to 31.4% of its initial intensity as a result of crystal formation throughout the sample was taken as the cloud point temperature. The above cloud point is a very desirable value for a plastic shortening which is useful for general purpose frying and baking.

The relative plastic consistency of the tempered shortening was determined by penetration tests. The determination was made with the aid of an A.S.T.M. grease penetrometer according to A.S.T.M. method D217–52T. Penetrations were determined at 50° F., 60° F., 70° F., 80° F., 90° F. and 100° F. on the fresh shortening (3 days after tempering) and on aged shortening held at each of the above temperatures for a period of one month. The penetration values are summarized in the table below.

|  | Temperature (F.) | | | | | |
| --- | --- | --- | --- | --- | --- | --- |
|  | 50° | 60° | 70° | 80° | 90° | 100° |
| Fresh (3 days after tempering): |  |  |  |  |  |  |
|   Penetration at Temperature | 165 | 182 | 205 | 213 | 226 | 252 |
|   Penetration, Returned to 70° F | 201 | 203 | 203 | 204 | 204 | 218 |
| After One Month Aging: |  |  |  |  |  |  |
|   Penetration at Temperature | 160 | 185 | 199 | 214 | 225 | 249 |
|   Penetration, Returned to 70° F | 201 | 200 | 199 | 208 | 205 | 209 |

The above penetration values show excellent stability in the plasticity of the beta-phase shortening of this invention. This shortening can be used for general purpose baking and frying.

Example 2

A plastic beta-phase shortening was prepared according to the method described in Example 1 with the following shortening formula:

| Component: | Percent by weight |
|---|---|
| Base stock (refined bleached soybean oil partially hydrogenated to an I.V. of about 107 and an S.C.I. of 0.32 at 70° F.) | 91 |
| Hardstock (substantially completely hydrogenated soybean oil and substantially completely hydrogenated rapeseed oil in a weight ratio of 1:1 and having an I.V. of 8) | 5 |
| Mono- and diglycerides of partially hydrogenated soybean and cottonseed oils (in a weight ratio of 85:15) having an I.V. of about 80 | 4 |

The specific processing conditions used were as follows:

Percent nitrogen injected into the shortening: 11.6%
Freezer outlet temperature: 55° F.
Picker box outlet temperature: 79° F.
Tempering time and temperature: 90° F. for 3 days The shortening had a cloud point of 32.7° C. and an S.C.I. of 6.22 at 70° F. Penetration values of the shortening are summarized in the table below:

| | Temperature (F.) | | | | | |
|---|---|---|---|---|---|---|
| | 50° | 60° | 70° | 80° | 90° | 100° |
| Fresh (1 day after Tempering): | | | | | | |
| Penetration at temperature | 162 | 188 | 212 | 220 | 232 | 267 |
| Penetration, returned to 70° F | 209 | 205 | 211 | 206 | 207 | 225 |
| After One Month Aging: | | | | | | |
| Penetration at temperature | 150 | 183 | 206 | 218 | 240 | 280 |
| Penetration, returned to 70° F | 210 | 202 | 204 | 208 | 215 | 231 |

The above cloud point and penetration values are highly desirable characteristics of a stable plastic shortening. This shortening can be used for general purpose baking and frying.

Example 3

A plastic beta-phase shortening was prepared according to the method described in Example 1 with the following shortening formula:

| Component: | Percent by weight |
|---|---|
| Base stock (refined, bleached soybean oil partially hydrogenated to an I.V. of about 107 and an S.C.I. of 0.32 at 70° F.) | 80 |
| Hardstock (substantially completely hydrogenated soybean oil and substantially completely hydrogenated rapeseed oil in a weight ratio of 3:1 and having an I.V. of 8) | 16 |
| Mono- and diglycerides of partially hydrogenated soybean and cottonseed oils (in a weight ratio of 85:15) having an I.V. of about 80 | 4 |

The specific processing conditions used were essentially the same as in Example 1. The shortening had a cloud point of 39.1° C. and an S.C.I. of 19.36 at 70° F. Penetration values of the shortening are summarized in the table below.

| | Temperature (F.) | | | | | |
|---|---|---|---|---|---|---|
| | 50° | 60° | 70° | 80° | 90° | 100° |
| Fresh (2 days after tempering): | | | | | | |
| Penetration at temperature | 85 | 95 | 100 | 110 | 117 | 130 |
| Penetration, returned to 70° F | 108 | 107 | 107 | 109 | 109 | 118 |
| After One Month Aging: | | | | | | |
| Penetration at temperature | 95 | 101 | 111 | 116 | 136 | 170 |
| Penetration, returned to 70° F | 112 | 112 | 110 | 113 | 121 | 142 |

The above procedure of Example 3 was repeated except that the hardstock was all (100%) substantially completely hydrogenated soybean oil instead of the blend of substantially completely hydrogenated soybean and rapeseed oil. The all-soybean shortening had a cloud point of 38.9° C., an S.C.I. of 21.55 at 70° F., and penetration values as follows:

| | Temperature (F.) | | | | | |
|---|---|---|---|---|---|---|
| | 50° | 60° | 70° | 80° | 90° | 100° |
| Fresh (3 days after tempering): | | | | | | |
| Penetration at temperature | 181 | 195 | 213 | 215 | 228 | 247 |
| Penetration, returned to 70° F | 210 | 209 | 212 | 210 | 211 | 213 |
| After One Month Aging: | | | | | | |
| Penetration at temperature | 175 | 199 | 211 | 220 | 231 | 266 |
| Penetration, returned to 70° F | 211 | 213 | 210 | 212 | 216 | 233 |

The above comparison in penetration values between the all-soybean hardstock beta-phase shortening and the blended hardstock beta-phase shortening clearly shows the substantial stiffening power produced by the described combination of rapeseed and beta-phase-tending hardstocks. That is, the blended hardstock shortening was substantially stiffer than the all-soybean hardstock shortening, using the same total amount of hardstock in both shortenings. The solid phase of both shortenings was predominantly (about 100%) beta-phase as determined by X-ray diffraction patterns.

Example 4

A plastic beta-phase shortening was prepared according to the method described in Example 1 with the following shortening formula:

| Component: | Percent by weight |
|---|---|
| Base stock (refined, bleached soybean oil partially hydrogenated to an I.V. of about 107 and an S.C.I. of about 0.32 at 70° F.) | 80 |
| Hardstock (substantially completely hydrogenated soybean oil and substantially completely hydrogenated cottonseed oil in a weight ratio of 3:1 and having an I.V. of 8) | 16 |

| Component—Continued | Percent by weight |
|---|---|
| Mono- and diglycerides of partially hydrogenated soybean and cottonseed oils (in a weight ratio of 85:15) having an I.V. of about 80 | 4 |

The specific processing conditions used were as follows:

Percent nitrogen injected into the shortening: 11.8%
Freezer outlet temperature: 55° F.
Picker box outlet temperature: 75° F.
Tempering time and temperature: 90° F. for 3 days The shortening had a cloud point of 38.3° C. and an S.C.I. of 21.68 at 70° F. Penetration values of the shortening are summarized in the following table:

| | Temperature (F.) | | | | | |
|---|---|---|---|---|---|---|
| | 50° | 60° | 70° | 80° | 90° | 100° |
| Fresh (3 days after tempering): | | | | | | |
| Penetration at temperature | 134 | 150 | 163 | 168 | 177 | 208 |
| Penetration, returned to 70° F | 167 | 163 | 164 | 165 | 173 | 178 |
| After One Month Aging: | | | | | | |
| Penetration at temperature | 137 | 156 | 165 | 175 | 185 | 225 |
| Penetration, returned to 70° F | 167 | 167 | 166 | 164 | 175 | 196 |

By way of comparison, a similarly prepared beta-phase shortening containing all-soybean (100%) hardstock instead of the above blend of beta- and non-beta-phase-tending hardstocks had penetration values about 25% higher at any of the above given temperatures.

Example 5

A plastic beta-phase shortening was prepared with the following components:

| Component: | Percent by weight |
|---|---|
| Base stock (refined, bleached soybean oil partially hydrogenated to an I.V. of about 85 and an S.C.I. of 11) | 58 |
| Hardstock (substantially completely hypdrogenated soybean oil and substantially completely hydrogenated rapeseed oil in a weight ratio of 2½:1 and having an I.V. of 8) | 35 |
| Mono- and diglycerides of partially hydrogenated soybean and cottonseed oils (in a weight ratio of 85:15) having an I.V. of about 80 | 4 |
| Polyoxyethylene sorbitan monostearate ("Tween 60") | 3 |

The above shortening components were melted together by heating to a temperature slightly in excess of 150° F. The melted oil was pumped through a scraped wall heat exchanger ("Votator") in which the oil was rapidly chilled to a temperature of about 85° F. The chilled supercooled mixture which issued from the refrigerated heat exchanger was pumped into containers (50 lb. size cubes, polyethylene lined) and allowed to crystallize substantially completely. The containers with the substantially completely crystallized shortening were placed in a constant temperature room having a temperature of about 120° F. The shortening was allowed to remain in this room after reaching a temperature of about 110° F. for a period of about 12 hours, during which time the solid phase of the shortening was converted to predominantly (greater than 70%) beta-phase crystals as determined by X-ray diffraction patterns.

The above beta-phase plastic shortening was used to prepare a storage-stable, packaged, ready-to-use aerated icing comprising sugar, water, and shortening.

When other beta-phase-tending hardstocks such as tristearin, tripalmitin and symmetrical palmitodistearin are substituted for the substantially completely hydrogenated soybean oil, and other non-beta-phase-tending hardstocks such as substantially completely hydrogenated mustard seed oil, herring oil, and pilchard oil are substituted for the rapeseed and cottonseed hardstock in the above examples, in weight ratios of about 9:1 to about 1:1 (beta-phase-tending hardstock to non-beta-phase-tending hardstock), comparable storage-stable plastic beta-phase shortenings are obtained. When partially hydrogenated cottonseed oil having an iodine value of about 100 and a solids content index of about 0 to 3 at 70° F. is substituted for the partially hydrogenated soybean oil base stock in the above examples, substantially similar storage-stable plastic beta-phase shortenings are obtained. Other base stocks, such as partially hydrogenated corn oil having an I.V. of about 60 and an S.C.I. of about 55 to 60, can be substituted for the partially hydrogenated soybean oil base stock in the above examples with substantially equivalent results.

What is claimed is:
1. A shortening comprising, by weight, (a) from about 50% to about 95% glyceride base stock having an iodine value of from about 50 to about 130 and (b) from about 5% to about 50% substantially completely hydrogenated triglyceride hardstock having an iodine value not exceeding about 12, said substantially completely hydrogenated triglyceride hardstock consisting essentially of beta-phase-tending hardstock and non-beta-phase-tending hardstock in a weight ratio of from about 9:1 to about 1:1, said shortening being rapidly chilled from a substantially completely melted mixture of components (a) and (b) to a temperature of from about 55° F. to about 90° F. and converted to a rigidly interlocking structure of predominantly beta-phase crystals, said shortening maintaining its plastic consistency and spreadability for extending storage periods.

2. The shortening of claim 1 in which the base stock is partially hydrogenated soybean oil having an iodine value of from about 75 to about 110.

3. The shortening of claim 1 in which the beta-phase-tending hardstock is substantially completely hydrogenated soybean oil.

4. The shortening of claim 1 in which the non-beta-phase-tending hardstock is substantially completely hydrogenated rapeseed oil.

5. A shortening comprising, by weight, (a) from about 50% to about 95% partially hydrogenated soybean oil having an iodine value of from about 75 to about 110 and (b) from about 5% to about 50% substantially completely hydrogenated triglyceride hardstock having an iodine value not exceeding about 12, said hardstock consisting esesntially of substantially completely hydrogenated soybean oil and substantially completely hydrogenated rapeseed oil in a weight ratio of from about 9:1 to about 1:1, said shortening being rapidly chilled from a substantially completely melted mixture of components (a) and (b) to a temperature of from about 55° F. to about 90° F. and converted to a rigidly interlocking structure of predominantly beta-phase crystals, said shortening maintaining its plastic consistency and spreadability for extended storage periods.

6. A shortening comprising, by weight, (a) from about 55% to about 70% glyceride base stock having an iodine value of from about 50 to about 130 and (b) from about 30% to about 45% substantially completely hydrogenated triglyceride hardstock having an iodine value not exceeding about 12, said substantially completely hydrogenated triglyceride hardstock consisting essentially of beta-phase-tending hardstock and non-beta-phase-tending hardstock in a weight ratio of from about 9:1 to about 1:1, said shortening being rapidly chilled from a substantially completely melted mixture of components (a) and (b) to a temperature of from about 55° F. to about 90° F. and converted to a rigidly interlocking structure of predominantly beta-phase crystals, said shortening maintaining its plastic consistency and spreadability for extended storage periods.

7. The shortening of claim 6 in which the base stock is partially hydrogenated soybean oil having an iodine value of from about 75 to about 110.

8. The shortening of claim 6 in which the beta-phase-tending hardstock is substantially completely hydrogenated soybean oil.

9. The shortening of claim 6 in which the non-beta-phase-tending hardstock is substantially completely hydrogenated rapeseed oil.

10. A shortening comprising, by weight (a) from about 55% to about 70% partially hydrogenated soybean oil having an iodine value of from about 75 to about 110 and (b) from about 30% to about 45% substantially completely hydrogenated triglyceride hardstock having an iodine value not exceeding about 12, said hardstock consisting essentially of substantally completely hydrogenated soybean oil and substantially completely hydrogenated rapeseed oil in a weight ratio of from about 9:1 to about 1:1, said shortening being rapidly chilled from a substantially completely melted mixture of components (a) and (b) to a temperature of from about 55° F. to about 90° F. and converted to a rigidly interlocking structure of predominantly beta-phase crystals, said shortening maintaining its plastic consistency and spreadability for extended storage periods.

References Cited by the Examiner
UNITED STATES PATENTS

| | | | |
|---|---|---|---|
| 2,521,219 | 9/1950 | Holman et al. | 99—118 |
| 2,521,242 | 9/1950 | Mitchell | 99—118 |
| 2,801,177 | 7/1957 | Lutton | 99—118 |
| 2,815,285 | 12/1957 | Holman et al. | 99—118 |
| 2,875,065 | 2/1959 | Thompson | 99—118 |
| 3,102,814 | 9/1963 | Thompson | 99—118 |
| 3,129,102 | 4/1964 | Sanders | 99—118 X |

A. LOUIS MONACELL, *Primary Examiner.*

M. W. GREENSTEIN, *Assistant Examiner.*